Feb. 21, 1961 P. HERSH 2,972,736

BI-DIRECTIONAL MAGNETIC TAPE RECORDING

Filed March 11, 1957 2 Sheets-Sheet 1

INVENTOR.
PHYLLIS HERSH

BY Charles C. Allyn

ATTORNEY.

BI-DIRECTIONAL MAGNETIC TAPE RECORDING

Filed March 11, 1957 2 Sheets-Sheet 2

INVENTOR.
PHYLLIS HERSH
BY Charles C. Allyn
ATTORNEY

United States Patent Office 2,972,736

Patented Feb. 21, 1961

2,972,736

BI-DIRECTIONAL MAGNETIC TAPE RECORDING

Phyllis Hersh, Teaneck, N.J., assignor, by mesne assignments, to Curtiss-Wright Corporation, Carlstadt, N.J., a corporation of Delaware Filed Mar. 11, 1957, Ser. No. 645,339

1 Claim. (Cl. 340—174.1)

This invention relates to magnetic recordings and more particularly to the recording and reproducing of information on magnetic tape.

Information in the form of discrete areas of magnetization may be stored on a magnetic tape. The discrete areas are impressed on a suitably coated tape by current waveforms passing through a recording head as the tape moves past. At a later time, the discrete areas induce voltages in a reproducing head when the tape moves past such a head. In this manner it is possible to use a magnetic tape as a storage medium.

In the field of data processing, information is usually represented in a binary system. The binary representation may be the presence or absence of a pulse signal, the presence or absence of an area of magnetization, or the state of a bistable device. In a typical tape operation current pulses are fed to a recording head as a magnetic tape moves by the head at a constant speed. These current pulses are converted to discrete areas of magnetization on the magnetic tape. When the tape is moved past a reproducing head the discrete areas of magnetization are converted to voltage pulse signals.

To increase the amount of information that can be stored on a length of magnetic tape multichannel magnetic tapes are often used. Multichannelling permits the use of shorter lengths of tape for storing a given quantity of information. Shorter lengths of tape permit more rapid access to the information stored on the tape. As an example of a multichannel tape use, assume that the decimal digits are encoded in a standard four bit binary code. Then each bit of a decimal digit is recorded on one of four parallel channels and each decimal digit occupies one pulse width along the tape. Thus the length of the tape is effectively decreased by a factor of four. Although such a scheme requires wider tapes and multichannel transducing heads, the great saving in time justifies the extra equipment.

In some instances an extra channel (a sprocket channel) is provided to facilitate the location of characters. Such a channel carries a recording of pulse signals indicating the location of the characters. Whenever a signal is read from the sprocket channel an indication is given that the signals in the co-parallel channels are valid information signals.

Because wider tape is used in multichannel operations there is always the possibility of tape skewing. The tape may stretch along one edge and not the other. Thus, instead of the bits (binary units) in a character being in a line perpendicular to the tape motion and therefore parallel to the line formed by the tips of the transducing heads they are in a line which is not perpendicular to the direction of tape motion and therefore skew to the line formed by the tips of the transducing heads. Hence if the simultaneous sensing of all channels occurs under the direction of the sprocket pulse signal it is possible to misread the information signals when tape skewing is present.

It is therefore an object of the invention to provide an improved magnetic recording-reproducing system.

It is another object of the invention to provide an improved recording-reproducing system that employs a multichannel magnetic tape having a sprocket channel.

It is a further object of the invention to provide an improved magnetic recording-reproducing system which minimizes the effects of skewing of a multichannel magnetic tape.

In accordance with the invention apparatus is provided for magnetically recording and reproducing information. The information is recorded as pulse signals on a moving multichannel or multitrack magnetic tape. Upon one channel (a sprocket channel) is recorded a train of pulse signals which are designated as sprocket pulses. In channels parallel to the sprocket channel information signals are recorded. The transducer for recording the pulse signals is a plurality of magnetic recording heads. These recording heads have their pole gaps aligned in a line perpendicular to the motion of the multichannel magnetic tape. Thus the information pulses that are recorded at the same time as the sprocket pulses have the same linear displacement along the tape as the sprocket pulses.

During playback a reproducing transducer which may be the recording transducer simultaneously receives the information pulses and the sprocket pulses. Information pulses are sensed by bistable devices which set into one of their stable states when the leading edges of the information pulses are detected. When the trailing edge of a sprocket pulse is detected by a sprocket pulse detector at a later time, the outputs of the bistable devices are sampled for information and all the bistable devices are set in the other of the stable states.

Since each of the pulse signals has a fixed pulse width in the order of hundreds of microsceonds there is an appreciable time lag between the setting of the bistable devices and the testing of their outputs. This time lag converted to linear distance along a tape moving at a known velocity can accommodate a reasonable skew angle.

It should also be noted that when the recorded sprocket pulses and information pulses have their centers colinear it is possible to reliably read the information pulses when the tape is moving in either direction. The properties of the playback voltages associated with recorded pulse signals permits a bidirectional operation when the apparatus of the invention is utilized.

Other objects, features and advantages of the invention will be evident from the following detailed description when read in connection with the accompanying drawings wherein.

Figure 1:
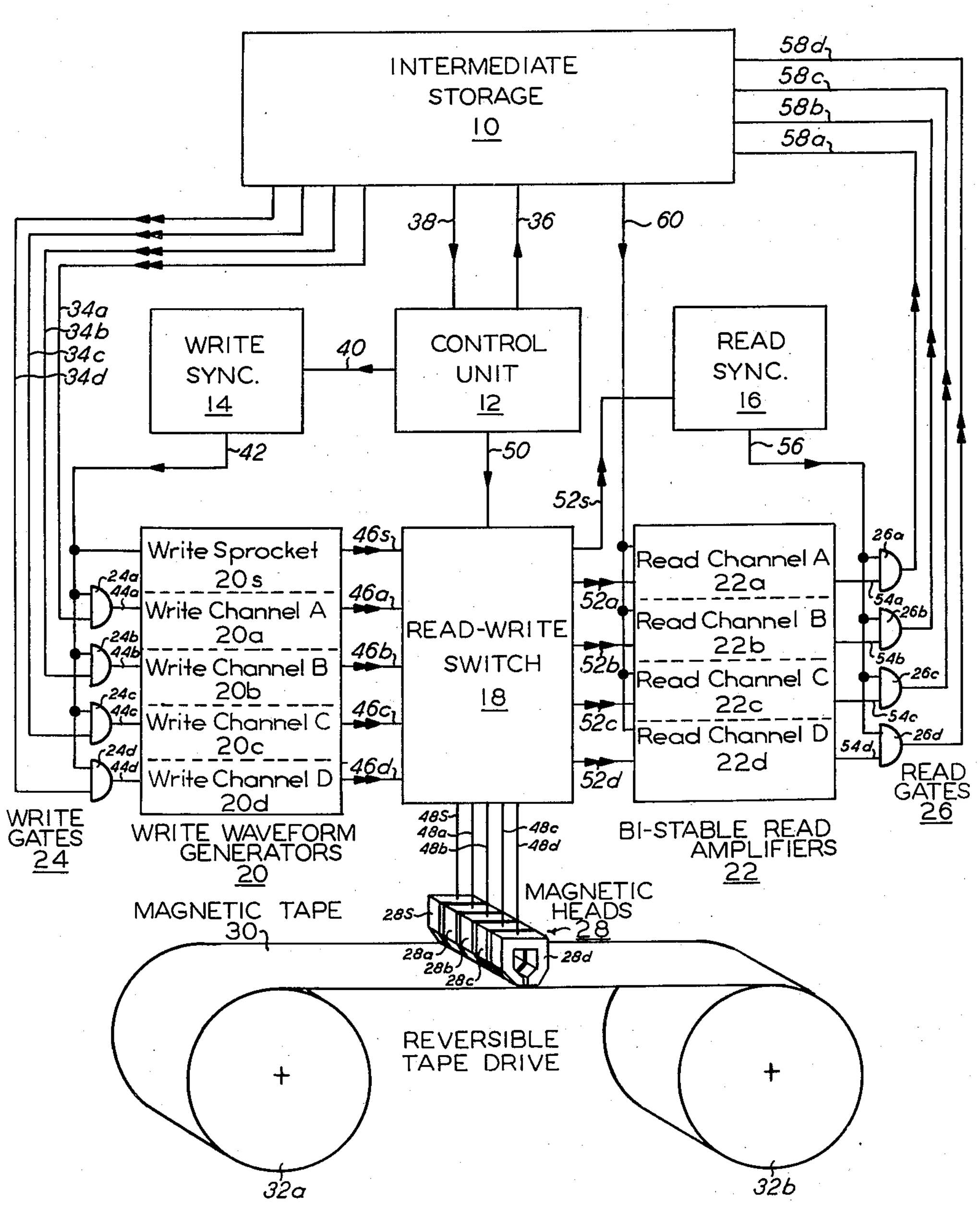
Fig. 1 shows the apparatus of the invention in block diagram form.

Referring to Fig. 1 the apparatus of the invention is shown comprising the intermediate storage 10, the control unit 12, the write synchronizer 14, the read synchronizer 16, the read-write switch 18, the write waveform generators 20, the bistable read amplifiers 22, the write gates 24, the read gates 26, the magnetic heads 28, and the multichannel magnetic tape 30 and the reels 32.

The units are interconnected by means of arrowheaded lines which indicate signal leads. The directions of the arrowheads designate the direction of signal flow. Single arrowheaded lines are assigned to control signals while double arrowheaded lines are for information signals.

As an example of the operation of the apparatus information in the form of decimal digits will be transferred to and from the multichannel magnetic tape 30. The decimal digits are represented by the standard 8, 4, 2, 1 binary code in which four binary digits or bits are required to represent one decimal digit.

At the start of the transfer of decimal digits from the intermediate storage 10 to the multichannel magnetic tape 30 the control unit 12 sends a signal via the line 36 to the intermediate storage 10 to activate its synchronizing circuitry. As the signals representing the first decimal digit are transferred along the lines 34 a signal is sent back to the control unit 12 along the line 38. The control unit 12 feeds a signal via the line 40 which activates the write synchronizer 14. The write synchronizer 14 feeds a signal to each of the write gates 24 via the line 42. This signal activates the sprocket write waveform generator 20*s* and probes the write gates 24.

The write gates 24 will pass signals to their respective writing waveform generators 20*a–d* via the lines 44 according to the presence or absence of signals on the lines 34 during the occurrence of the sprocket signal on the line 42.

The generated current waveforms pass via the lines 46 through the read-write switch 18 (set in the write position) and the lines 48 to the magnetic heads 28. The current waveforms passing through the magnetic heads 28 record discrete areas of magnetization hereinafter called magnetization pulses on the appropriate channels of the multichannel magnetic tape 30. The recording operation continues decimal digit by decimal digit until all the decimal digits are recorded.

During a reproducing operation, the read-write switch 18 is set to the read position by a signal on the line 50 from the control unit 12. As the multichannel magnetic tape 30 moves past the magnetic heads 28 voltages which are time derivatives of the magnetization pattern are induced in each magnetic head 28.

The voltages or signals induced in the magnetic heads 28*a–d* are fed via the lines 48*a–d* through to read-write switch 18 and the lines 52*a–d* to the bistable read amplifiers 22. When the potentials of these signals exceed a certain value related to the leading edge of the magnetization pulses the associated bistable read amplifiers 22 are triggered to the "on" state and positive potentials appear on the associated lines 54. At the same time, a similar signal from the sprocket channel is picked up by the magnetic head 28*s* and fed via the line 48*s* through the read-write switch 18 and the line 52*s* to the read synchronizer 16. The signal is inverted and fed via the line 56 to the read gates 26. The inverted signal probes the gates 26 and permits the feeding of pulse signals via the lines 58 to the intermediate storage 10 for information storage.

Upon receipt of the signals the intermediate storage 10 feeds a signal via the line 60 to switch bistable reading amplifiers 22 to their "off" state. In this manner information is fed a decimal digit at a time from the multichannel magnetic tape 30 to the intermediate storage 10.

It should be noted that a sprocket pulse is recorded at the same time the pulse signals representing a decimal digit are recorded. This sprocket pulse signal is the same in shape and timing as the information pulse signals. During the reproduction cycle, the positive going portions of the information signals are detected while in effect the negative going portions of the sprocket signals are detected. A study of Fig. 2 will show the advantages of such a procedure when the playback wave shapes are considered.

Figure 2:
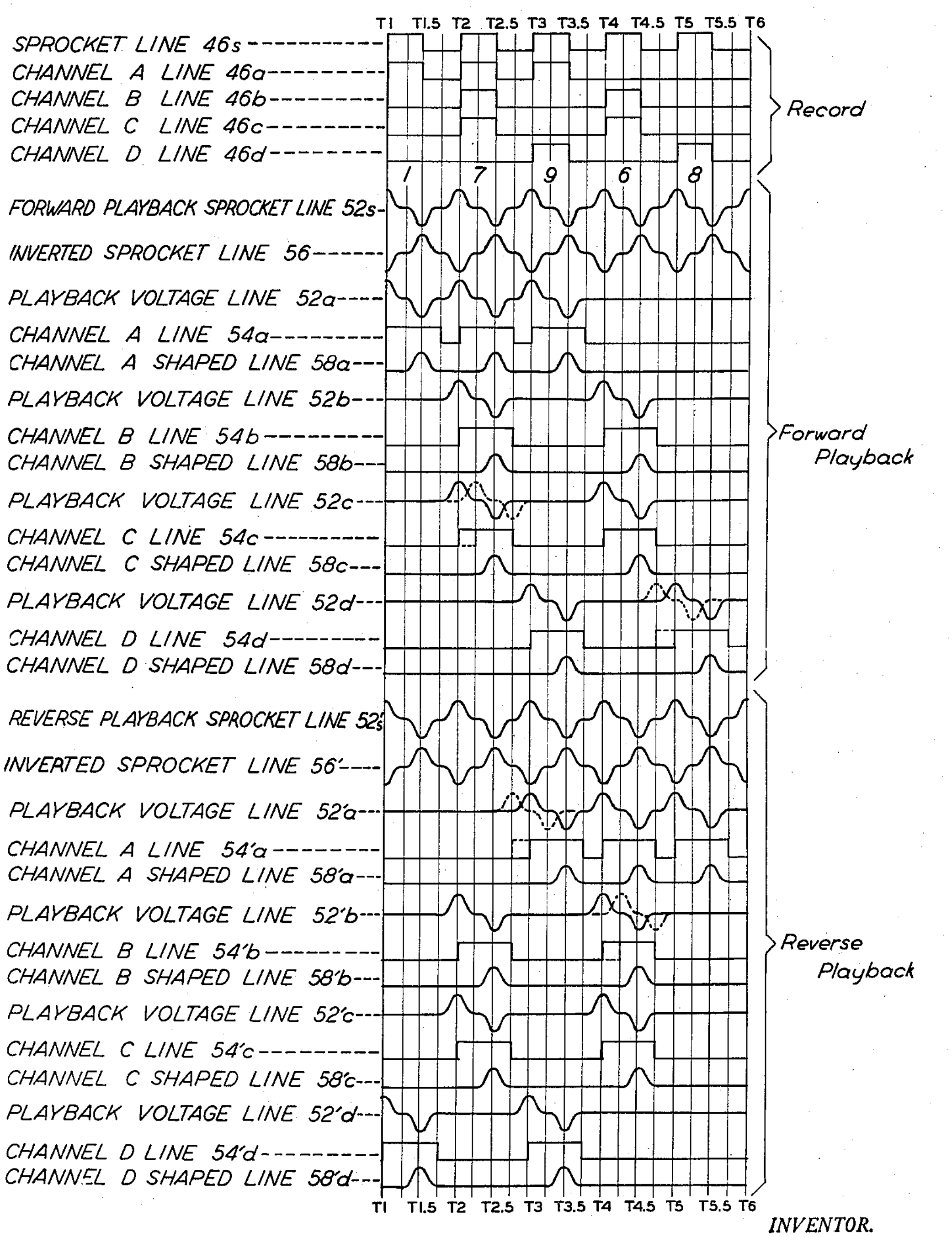
Fig. 2 shows recording and playback waveforms of information and sprocket pulse signals handled by the apparatus of the invention.

Fig. 2 shows the waveforms of signals present on pertinent lines for particular time intervals during a recording and a reproducing cycle. The reference character of the signals and the line carrying the signals are identical. The decimal digits 17968 are being handled.

At a time T1, a sprocket pulse is transmitted on the line 46*s* and an information pulse is transmitted on the line 46*a*. This is equivalent to recording 0001 or decimal one on the information channels. At time T2, a sprocket pulse is transmitted along the line 46*s* and information pulses along the lines 46*a*, 46*b*, 46*c*. This is equivalent to 0111 or decimal seven. The remaining decimal digits are similarly recorded. The signals shown for the lines 46 are current waveforms that are fed to the appropriate magnet heads 28. The actual magnetization pattern recorded on the channels of the multichannel tape 30 are similar in shape except that the rise and fall (or the leading and trailing edges) of the pulses in magnetization patterns are not as rapid (or steep).

Two possible reproducing passes are possible. A forward reproducing pass is one in which the multichannel magnetic tape 30 moves past the magnetic heads 28 in the same direction as during a recording pass. A reverse reproducing pass is one in which the multichannel magnetic tape 30 moves the opposited irection.

The waveforms 52, 54, 56 and 58 are associated with a forward reproducing pass. The waveform 52*s* is the playback signal of the sprocket pulses. Since the playback signals are time derivatives of the magnetization pattern a positive lobe occurs at T1 which coincides with the positive going leading edge of the magnetization pattern resulting from the sprocket pulse transmitted on line 46*s* at time T1. Similarly, the negative lobe shown at T1.5 of line 52*s* results from the negative going trailing edge of the magnetization pattern.

The signals on the line 56 are the inverse of the signals on the line 52*s*. This permits a positive pulse to indicate the trailing edge of a sprocket pulse.

The signals on the lines 52*a–d* are the voltage waveforms of playback of the information signals. Each positive lobe coincides with the leading edge of a magnetization pulse. These positive lobes are used to set trigger circuits of the bistable read amplifiers 22 of Fig. 1 which generate the waveforms of lines 54.

The waveforms associated with the lines 58 result from the gating together of the voltages of the line 56 with the voltages on the lines 54. The pulses on the lines 58 are the reproduced information pulses which may be shaped by standard techniques.

It should be noted that if one of the information pulses is later in time than the rest (see the dotted portion of waveform 52*c*) the pulse is still reproduced. If one information pulse is earlier than the rest it also is reproduced (see the dotted portion of line 52*d*). This occurs because the leading edge of the information pulses sets the trigger circuits while the trailing edges of the sprocket pulse samples the outputs of the trigger circuits.

During a reverse reproducing pass similar waveforms are generated except the decimal digits are read in reverse order. The primed waveforms 52′, 54′, 56′ and 58′ of Fig. 2 are associated with a reverse reproducing pass. In this case the leading edges of the magnetization pulses are considered to be the edges first sensed by the magnetic heads 28. Because the edges first sensed by the magnetic heads are always positive going the induced voltages are similar in shape for magnetization pulses in both a forward and reverse reproducing pass.

The intermediate storage 10 may be any conventional buffer storage register such as a magnetic core shift register or a recirculating delay line register. The control unit 12 may be a plurality of synchronized switching circuits which are well known in the art. The write synchronizer 14 can in a simple form be a free running symmetrical multivibrator which is capable of being controllably turned off. The read synchronizer 16 can be a standard power amplifier capable of inverting signals. The read-write switch 18 in its simplest form is a multipole relay. The write waveform generators 20 are transformer output current amplifiers. The bistable read amplifiers 22 may be conventional flip flops or the Eccles-Jordan type which are well known in the art.

The write gates 24 and the read gates 26 are conventional diode "and" gates. The magnetic heads 28 and the apparatus associated with the multichannel magnetic tape 30 is a commercial tape drive unit such as manufactured by Potter Instrument Company.

Thus, apparatus has been shown which can accommodate time displacement in the occurrence of pulse signals carried along parallel channels and in particular to such displacement resulting from tape skewing in a magnetic recording and reproducing system.

There will now be obvious to those skilled in the art, many modifications and variations utilizing the principles set forth and realizing many or all of the objects and advantages of the circuits described but which do not depart essentially from the spirit of the invention.

What is claimed is:

A reproducing apparatus for a multi-channel magnetic tape which stores tape sprocket signals and tape information signals, said signals being arranged in transverse rows and in a longitudinal sprocket signal channel and a plurality of longitudinal information signal channels, said information signals being in the form of spaced magnetized areas each signifying one binary digit and unmagnetized areas each signifying the other binary digit, each row including one of said tape sprocket signals in the form of a magnetized area to identify such row and to distinguish it from unmagnetized inter-row spaces, especially in the case of a row composed of only unmagnetized tape information signal areas to signify presence of said other binary digit in each information signal channel for such row, said apparatus comprising a reproducing head for each channel adapted to sense only magnetized areas in its associated channel, and producing an electrical signal pulse in response to such sensing, whereby when said tape is caused to pass said recording heads in either direction an electrical sprocket pulse is generated for each row as derived from the tape sprocket signal of such row and binary digit electrical pulses are generated only for corresponding magnetized areas in said information channels to represent said one binary digit, each said pulse being defined by a leading and a trailing edge which correspond respectively to the first and last sensed edges of a given magnetized area on said tape as said tape passes the corresponding reproducing head in either direction, the leading edges of the pulses derived from any given row being substantially concurrent and the trailing edges of the pulses derived from any given row being substantially concurrent, a bistable device connected to each information channel reproducing head and settable to one state responsive to the leading edges of the associated binary digit pulses to produce corresponding reshaped binary digit pulses, a gate connected to each bistable device and responsive to coincidence of a reshaped binary digit pulse and the trailing edge of the associated electrical sprocket pulse to emit a pulse that is substantially concurrent with the trailing edge of the associated sprocket pulse giving rise to such emitted pulse, an information storage unit to receive the emitted pulses, said information storage unit including delay means accepting said emitted pulses, and providing a delayed output pulse for each group of emitted pulses derived from a common row, and means for applying the delayed output pulses to said bistable devices to reset the set bistable devices to their other states, whereby the possibility of incorrect tape information signal reproduction due to tape skewing is substantially eliminated.

References Cited in the file of this patent

UNITED STATES PATENTS

| | | |
|---|---|---|
| 2,751,439 | Burton | June 19, 1956 |
| 2,793,344 | Reynolds | May 21, 1957 |